J. F. GUYN.
STREET CAR FENDER.
APPLICATION FILED OCT. 12, 1912.
1,081,736.
Patented Dec. 16, 1913.
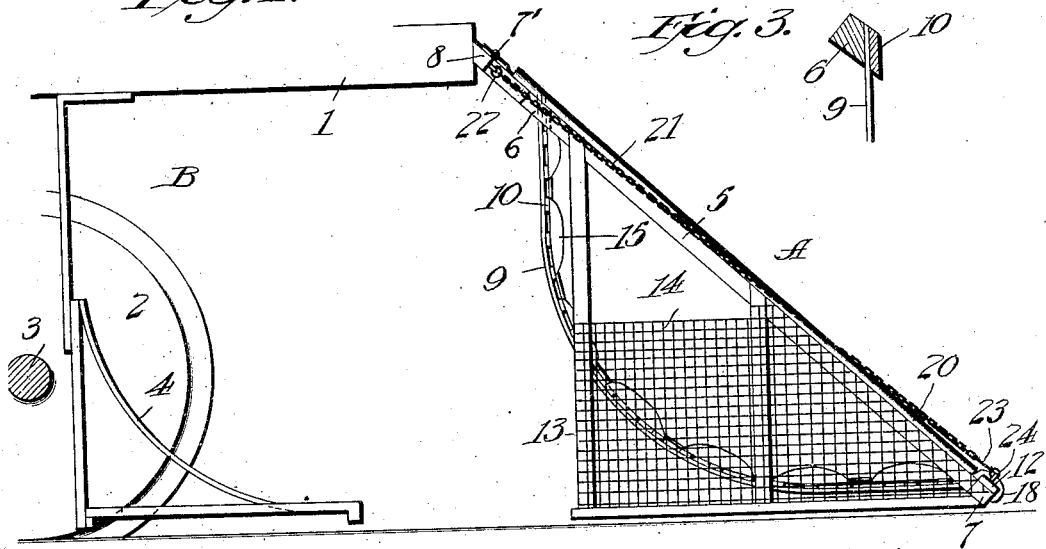
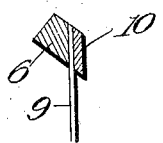
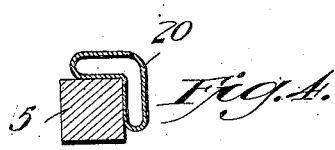
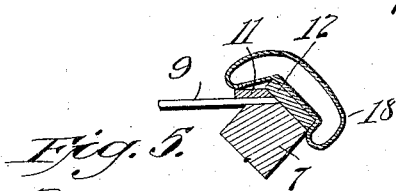
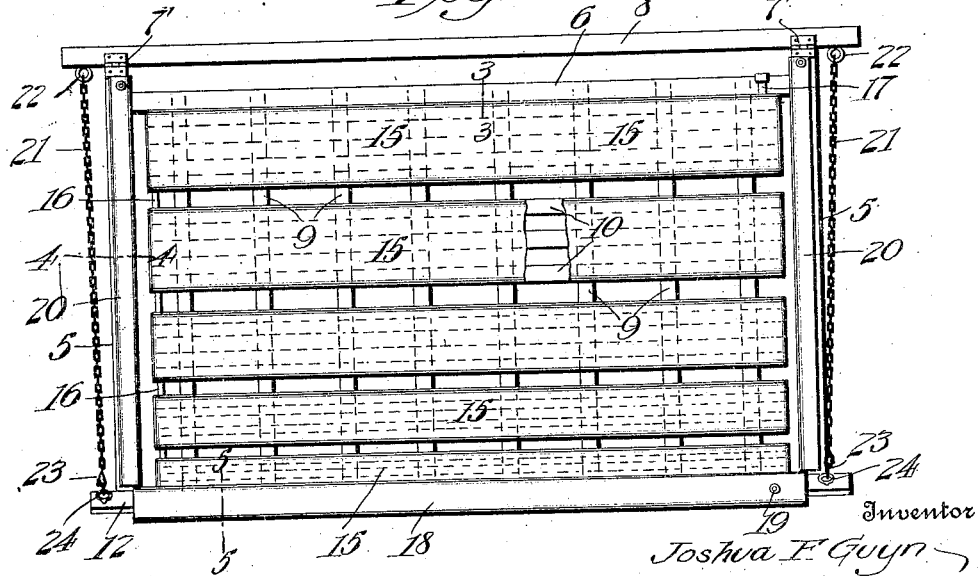
Inventor
Joshua F. Guyn
Witnesses
By
Attorney

UNITED STATES PATENT OFFICE.

JOSHUA F. GUYN, OF THOROFARE, NEW JERSEY.

STREET-CAR FENDER.

1,081,736.

Specification of Letters Patent.  Patented Dec. 16, 1913.

Application filed October 12, 1912.  Serial No. 725,391.

*To all whom it may concern:*

Be it known that I, JOSHUA F. GUYN, a citizen of the United States, residing at Thorofare, in the county of Gloucester and State of New Jersey, have invented certain new and useful Improvements in Street-Car Fenders, of which the following is a specification, reference being had therein to the accompanying drawing.

This invention relates to fenders adapted for use in connection with street cars and other vehicles for preventing the loss of life of persons overtaken by the car or vehicle.

The invention has for one of its objects to improve and simplify the construction and operation of devices of this character so as to be reliable and efficient in use, composed of few parts, and capable of being readily applied to the vehicle with no material alteration therein.

Another object of the invention is the provision of a fender having a novel form of web which forms the bottom of the scoop structure of the fender, the purpose in view being simplicity and inexpensiveness of construction and the minimizing of injury to a person caught in the fender by reason of the web being formed of light resilient strips covered by pneumatic cushions or cells.

Another object of the invention is the provision of simple means for holding the fender in operative position without rendering it liable to a swinging up and down movement with the motion of the car.

With these objects in view and others, as will appear as the description proceeds, the invention comprises the various novel features of construction and arrangement of parts which will be more fully described hereinafter and set forth with particularity in the claim appended hereto.

In the accompanying drawing, which illustrates one embodiment of the invention, Figure 1 is a side view of the fender in applied position, only a portion of a car or vehicle being shown. Fig. 2 is a plan view of the fender. Fig. 3 is a detail view on line 3—3, Fig. 2. Figs. 4 and 5 are detail sectional views on lines 4—4 and 5—5 of Fig. 2, respectively.

Similar reference characters are employed to designate corresponding parts throughout the views.

Referring to the drawing, A designates the fender, and B, the car to which the fender is applied, the platform 1, front wheels 2, axle 3 and wheel guard 4 of the car being the only parts shown. The fender is arranged at the front of the car in the usual manner and is carried by the platform 1 or any other suitable portion of the body of the car.

The fender B consists of side bars 5 which are connected by upper and lower horizontal bars 6 and 7, respectively, said bars forming a rectangular structure. The upper ends of the side bars 5 are attached by hinges 7' to the platform 1, either directly or by means of a strip or bar 8 which is itself fastened to the platform in any suitable manner. The rectangular structure of the fender supports a web which is composed of a series of bowed slats 9 and cross slats 10, the latter extending parallel with the upper and lower cross bars 6 and 7, while the bowed slats are at right angles thereto. Both series of slats are preferably made of oak and are of such thinness and width as to be resilient so as to give or yield when a person or object is caught up by the fender. The upper ends of the slats 9 are fastened to the top bar 6, as shown in Fig. 3, by being fastened between the bar 6 and the cross slats 10 suitably secured in place. The lower ends of the slats 9 are fastened to the bottom bar 7, as shown in Fig. 5, there being overlying strips 11 and 12 fastened to the bars 7 so as to firmly hold the slats 9 in place.

The side bars 5 have secured thereto a frame structure 13 which carries a wire or other netting 14 so as to coöperate with the web of the fender to form a scoop-like construction whereby an object caught up by the fender will be retained.

In order to minimize injury to a person caught in the fender, pneumatic cushioning means, in the form of sectional cells or cushions 15, are provided on the forward surface of the web. These sections extend from side to side of the fender and each covers a plurality of horizontal cross slats 10 to which the sections or cells are cemented or otherwise fastened. These sections or cells may be connected together as by tubular connections 16, and the air may be supplied to them by means of a nipple 17 to which an ordinary air pump can be attached. On the bottom bar 7 is an independent air cell or cushion 18 having a nipple 19, and the side bars 5 of the fender frame are also preferably covered with air cushions 20.

The means for suspending the fender in proper relation to the tract or road surface, and at the same time for preventing the fender from swinging upwardly, consists merely of single chains 21 which are shown at each end of the fender. These chains have their upper ends anchored at 22 on the car platform or on the fastening bar or plate 8, while the lower ends of the chains are connected by snap hooks 23 with eyes or rings 24 on the ends of the front bar 7. The points of attachment of the upper ends of the chains are eccentric to the hinges 7' to such an extent that the fender cannot be raised on the hinges as an axis as long as the chains 21 are attached to the front of the fender. Any forward swinging movement of the fender tends to lengthen the chains, but since the latter are non-extensible, the fender cannot swing upwardly; consequently, objectionable jolting and noise common in some types of fenders is positively avoided by the single chains which combine with the suspension feature a bracing effect. When the fender is to be raised to inoperative position, it is merely necessary to detach the chains from the fender and swing the latter upwardly on its hinges, suitable means being provided for retaining the fender in its inoperative position.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention, what I claim as new, is:—

In a car fender, an attaching horizontal bar, a scoop embodying triangular side frames hinged to said attaching bar, front and rear cross bars fastened to said side frames, flexible bows terminally fastened to said cross bars, parallel slats extending crosswise of said bows and fastened thereto, and hold down chains having their forward ends connected to the front corners of said frame and their rear ends connected to said attaching bar below the axis on which the frame is hinged to the attaching bar, said chains being detachable at one end.

In testimony whereof I affix my signature in presence of two witnesses.

JOSHUA F. GUYN.

Witnesses:
 ANNA L. ESTELL,
 JOSEPH B. BERT.

---

Copies of this patent may be obtained for five cents each, by addressing the "Commissioner of Patents, Washington, D. C."